(12) United States Patent
Sato (10) Patent No.: US 7,099,769 B2
(45) Date of Patent: Aug. 29, 2006

(54) MISFIRE DETECTOR FOR DETECTING MISFIRE OF INTERNAL COMBUSTION ENGINE

(75) Inventor: Fumihiko Sato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/968,969

(22) Filed: Oct. 21, 2004

(65) Prior Publication Data

US 2005/0090968 A1 Apr. 28, 2005

(30) Foreign Application Priority Data

Oct. 27, 2003 (JP) ............................. 2003-366283
Oct. 8, 2004 (JP) ............................. 2004-296337

(51) Int. Cl.
*G01M 15/11* (2006.01)

(52) U.S. Cl. .................... 701/114; 701/111; 73/116

(58) Field of Classification Search ................ None
See application file for complete search history.

(56) References Cited

U.S. PATENT DOCUMENTS 6,223,120 B1 * 4/2001 Williams .................... 701/111

FOREIGN PATENT DOCUMENTS

| JP | 4-101071 A | * | 4/1992 |
| JP | A 04-265475 | | 9/1992 |
| JP | A 10-331707 | | 12/1998 |

* cited by examiner

*Primary Examiner*—Andrew M. Dolinar
(74) *Attorney, Agent, or Firm*—Oliff & Berridge, PLC

(57) ABSTRACT

A misfire detector for an internal combustion engine sets an operating state of the internal combustion engine as a parameter and detects misfire based on the parameter. The misfire detector includes a friction-torque estimating unit and a misfire determining unit. The friction-torque estimating unit estimates indicated torque and inertial torque of the internal combustion engine when the load of the internal combustion engine is stable, obtains a difference between the indicated torque and the inertial torque, and estimates friction torque of the internal combustion engine using the difference. The misfire determining unit determines misfire by correcting the parameter using the friction torque estimated.

11 Claims, 10 Drawing Sheets

MISFIRE DETECTOR FOR DETECTING MISFIRE OF INTERNAL COMBUSTION ENGINE

BACKGROUND OF THE INVENTION

1) Field of the Invention

The present invention relates to a misfire detector that detects misfire of an internal combustion engine.

2) Description of the Related Art

Sometimes misfire occurs in internal combustion engines. The misfire may occur due to various reasons such as inadequate temperature in a combustion chamber, abnormality of an ignition system, and so on. When a misfire occurs, an engine speed drops so that engine torque that should originally be obtained is not output. Moreover, incompletely combusted gas that contains a large amount of hydrocarbon (HC) is discharged, which causes air pollution, moreover, a catalyst for purifying exhaust gas is damaged.

Japanese Patent Application Laid Open Publication (JP-A) No. H04-265475 discloses a misfire detector that detects a misfire. This misfire detector first obtains a value used to determine the combustion state of a cylinder in a current combustion stroke or of a cylinder in the immediately preceding combustion stroke (hereinafter, "cylinder in the preceding combustion stroke"). The value is obtained from the amount of motion when fuel is cut, and a misfire determination level in a misfire determination level map of the cylinder in the current combustion stroke or of the cylinder in the preceding combustion stroke is updated using the value.

Consequently, during normal operation, the misfire detector measures the amount of motion of the cylinder in the current combustion stroke or of the cylinder in the preceding combustion stroke in a predetermined zone upon fuel injection. If the amount of motion measured is equal to the misfire determination level or below, then the misfire detector determines that the amount of motion measured indicates misfire.

In the internal combustion engine, friction occurs between a piston and a cylinder or a journal and a bearing so that friction torque is generated depending on the amount of motion. The friction torque is generally correlated to temperature of lubricating oil between the piston and the cylinder and an engine speed. However, the correlation is not a linear correlation because it is a viscosity coefficient that changes caused by influence of the temperature of the lubricating oil. Therefore, generally, the friction torque is calculated using a map or a polynomial expression with a water temperature and the number of revolutions.

However, the characteristics of the friction torque change by degradation or the viscosity of the lubricating oil. The change is less correlated to the water temperature and the number of revolutions. Therefore, if such a change occurs, it is impossible to calculate accurate friction torque from the map or the like. Furthermore, how to determine the friction torque is not described in JP-A No. H04-265475. Therefore, if a difference occurs between the misfire determination level map updated and a misfire determination level map that should be obtained from a value corresponding to the actual amount of motion, and if the lubricating oil is degraded, the misfire cannot be detected with high precision.

SUMMARY OF THE INVENTION

It is an object of the present invention to solve at least the problems in the conventional technology.

A misfire detector according to an aspect of the present invention converts an operating state of an internal combustion engine in a parameter and detects misfire of the internal combustion engine by comparing the parameter, or a value based on the parameter, with a reference value, which is used to determine misfire. The misfire detector includes a friction-torque estimating unit that estimates friction torque of the internal combustion engine; and a misfire determining unit. The misfire determining unit determines whether misfire occurs based on either one of correcting the parameter using the friction torque estimated, and correcting the reference value using the friction torque estimated.

The friction-torque estimating unit includes a load-state determining unit that determines a load state of the internal combustion engine, wherein the friction-torque estimating unit estimates the friction torque when the load-state determining function determines that the load is stable.

The load-state determining unit determines that the load is stable when a clutch, which transmits drive force to a wheel, is disconnected.

The load-state determining unit determines that the load is stable when an engine speed of the internal combustion engine is stable.

The stable state of the engine speed indicates an idling state of the internal combustion engine.

The load-state determining unit determines that the load is stable when the internal combustion engine is during cranking.

The load-state determining unit determines that the load is stable when the internal combustion engine is in a fuel cut state.

The friction-torque estimating unit includes a load-state determining unit that determines a load state of the internal combustion engine; and a fuel cut unit that cuts supply of fuel to a specified cylinder when the load-state determining unit determines that the load is stable. The friction-torque estimating unit estimates the friction torque when the supply of fuel is cut.

The friction-torque estimating unit includes an indicated-torque estimating unit that estimates indicated torque of the internal combustion engine; and an inertial-torque estimating unit that estimates inertial torque of the internal combustion engine. The friction-torque estimating unit estimates the friction torque from a difference between the indicated torque and the inertial torque.

The friction-torque estimating unit estimates the friction torque when the internal combustion engine has any one of a predetermined engine speed and a predetermined temperature or both.

The friction-torque estimating unit further includes a motor-torque estimating unit that estimates motor torque of an electric motor that performs the cranking. The friction-torque estimating unit estimates the friction torque from the motor torque.

The friction-torque estimating unit has access to lubricating-oil property information that represents a change in properties including viscosity of lubricating oil. The friction-torque estimating unit estimates the friction torque using the lubricating-oil property information.

The other objects, features, and advantages of the present invention are specifically set forth in or will become apparent from the following detailed description of the invention when read in conjunction with the accompanying drawings.

DETAILED DESCRIPTION

Exemplary embodiments of a misfire detector according to the present invention are explained in detail below with reference to the accompanying drawings. It is noted that the present invention is not limited by these embodiments.

A misfire detector according to a first embodiment of the present invention (hereinafter, "first misfire detector") is explained below with reference to FIG. 1 to FIG. 6.

Figure 1:
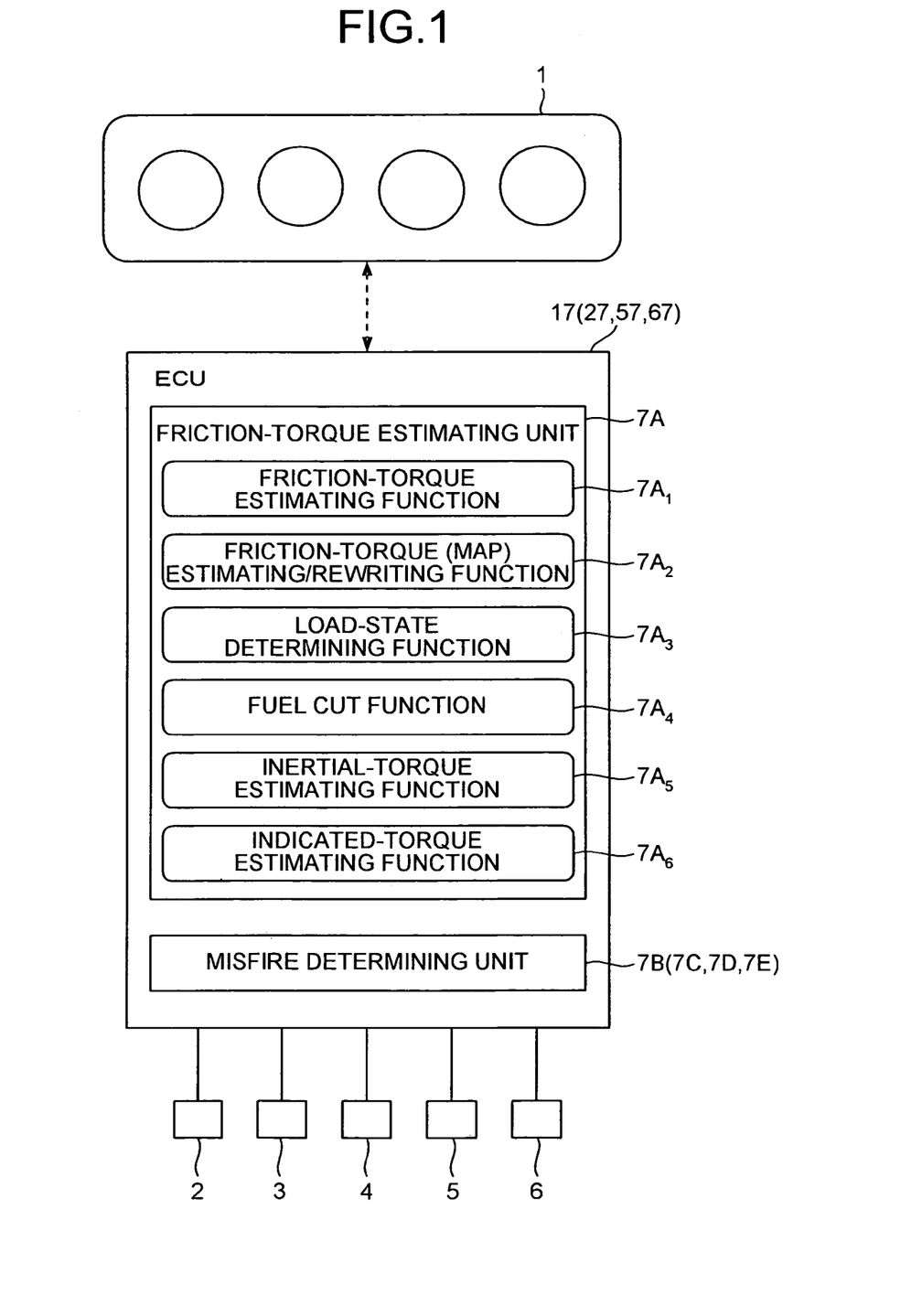
FIG. 1 is a block diagram of a misfire detector according to a first embodiment and a second embodiment of the present invention.

FIG. 1 depicts an internal combustion engine 1. The first misfire detector detects whether misfire occurs in the internal combustion engine 1. The internal combustion engine 1 includes various types of sensors. An air flow meter 2 detects the amount of intake air after passing through an air cleaner (not shown) and outputs an intake-air amount signal. A throttle opening sensor 3 detects the opening of a throttle valve (not shown) and outputs a throttle opening signal, and a crank angle sensor 4 that detects a rotational angle of a crankshaft and outputs a crank angle signal. A water temperature sensor 5 detects the temperature of coolant and outputs a coolant temperature signal, and an oil temperature sensor 6 that detects the temperature of lubricating oil and outputs a lubricating-oil temperature signal.

The sensors 2 to 6 output detection signals to an electronic control unit (ECU) 17. The ECU 17 includes a central processing unit (CPU) (not shown), a read only memory (ROM) (not shown) that previously stores predetermined control programs, a random access memory (RAM) (not shown) that temporarily stores the results of computation in CPU, and a backup RAM (not shown) that stores pre-prepared information. The ECU 17 further includes an engine control function that controls the internal combustion engine 1. For example, the ECU 17 controls the amount of fuel injection of a fuel injector (not shown).

The first misfire detector is explained in detail below. The ECU 17 functions as the first misfire detector.

The degradation of lubricating oil and the viscosity thereof causes the characteristics of friction torque Tf of the internal combustion engine 1 to change. As shown in a map of the friction torque Tf of FIG. 3, the friction torque Tf is characterized in that the amount of offset of a friction torque curve changes depending on a coolant temperature (or a lubricating-oil temperature). Therefore, if friction torque $Tf_2$ as shown in FIG. 4 explained later under arbitrary conditions (here, an arbitrary engine speed Ne and water temperature) can be estimated, the friction torque Tf in a substantially whole region can be estimated in consideration of the amount of offset.

The first misfire detector (ECU 17) includes a friction-torque estimating unit 7A, as shown in FIG. 1, that estimates the friction torque $Tf_2$ so as to detect misfire with high precision even if the friction torque Tf changes caused by degradation of the lubricating oil.

The friction-torque estimating unit 7A stops supplying fuel (hereinafter, "to execute fuel cut") to a specified cylinder when the load of the internal combustion engine 1 is stable, estimates the friction torque Tf in the substantially whole region based on the friction torque $Tf_2$ estimated upon execution of the fuel cut and friction torque $Tf_1$ on a current friction torque map, and rewrites the friction torque map. In other words, the friction-torque estimating unit 7A includes mainly a function $7A_1$ of estimating friction torque Tf (hereinafter, "friction-torque estimating function $7A_1$") at a point under a certain condition, and a function $7A_2$ of estimating friction torque Tf in the substantially whole region from the friction torque Tf estimated and rewriting the friction torque map (hereinafter, "friction-torque (map) estimating/rewriting function $7A_2$").

The friction-torque estimating function $7A_1$ ascertains the state of load of the internal combustion engine 1 and estimates the friction torque Tf. Therefore, the friction-torque estimating unit 7A also includes a load-state determining function $7A_3$, as shown in FIG. 1, which determines whether the load of the internal combustion engine 1 is stable (which indicates no load on the internal combustion engine 1). The friction-torque estimating unit 7A further includes a fuel cut function $7A_4$, as shown in FIG. 1, which executes fuel cut to a specified cylinder when the load is stable.

As explained above, the friction-torque estimating unit 7A estimates the friction torque Tf when the load is stable, which allows improved precision of the estimated value and improved precision of the friction torque Tf in the substantially whole region estimated in the manner as explained later. Furthermore, by executing fuel cut, the load fluctuations due to combustion are eliminated, which allows estimation of the friction torque Tf with further higher precision.

When the load of the internal combustion engine 1 is stable it means that (1) a clutch, which transmits drive force to wheels, is disconnected, (2) the engine speed Ne of the internal combustion engine 1 is stable, (3) the internal combustion engine 1 is in the fuel cut state, or (4) the internal combustion engine 1 is during starting (i.e., during cranking).

The load-state determining function $7A_3$ determines the load state of the internal combustion engine 1 based on all of or at least one of the cases (1) to (4).

When it is to be determined that the load is stable because the clutch is disconnected, the load-state determining function $7A_3$ uses a signal indicating a clutch disconnected state output to the ECU 17 when a driver depresses a clutch pedal if the vehicle is a manual transmission vehicle. When the clutch is in disconnected state, load due to fluctuations in rotation of the wheels is not input from the surface of a road, which allows a more stable load state, and the friction-torque estimating function $7A_1$ can estimate higher-precision friction torque Tf.

When it is to be determined that the load is stable because the engine speed Ne is stable, the load-state determining function $7A_3$ uses a detection signal of the crank angle sensor 4 input to the ECU 17. For example, the stable state of the engine speed Ne sometimes indicates an idling state. Generally, the idling state indicates that the vehicle is at rest. Therefore, no load is input from the surface of the road in the same manner as in (1), which allows higher-precision friction torque Tf to be estimated. Furthermore, by executing fuel cut explained later when the vehicle is at rest, the fuel cut does not affect driving. For example, a driver and a passenger of a car do not have any unpleasant feeling due to deceleration G. The idling state mentioned here indicates a state in which a constant idling speed is maintained even in a short time.

The fuel cut state according to the case (3) is determined by whether the ECU 17 has transmitted a fuel-cut instruction to the fuel injector. In such a fuel cut state, the load is not fluctuated caused by combustion, which allows a more stable load state and higher-precision estimation of the friction torque Tf. When the friction torque Tf is to be estimated at the time of the fuel cut state, the internal combustion engine 1 is already in the fuel cut state. Therefore, the fuel cut is not executed before the estimation, which is explained later.

When it is determined whether the load is stable by whether the internal combustion engine 1 is during cranking according to the case (4), the load-state determining function $7A_3$ uses an on-signal of a starter switch (not shown) input to the ECU 17. During such cranking, the internal combustion engine 1 is made rotate only by an electric motor, and therefore, the engine speed Ne is stable, which allows a more stable load state and higher-precision estimation of the friction torque Tf.

As explained above, when the load-state determining function $7A_3$ determines that the load is stable, the friction-torque estimating function $7A_1$ estimates friction torque Tf based on the following equations in a control program stored in the ROM of the ECU 17. The equation (2) with which the friction torque Tf can be obtained is explained in detail below.

A relationship between torque of the internal combustion engine 1 and angular acceleration of the crankshaft is shown in the equation (1).

$$J\frac{d\omega}{dt} + Tf + Tl = Ti \quad (1)$$

where J is inertial moment, $d\omega/dt$ is angular acceleration, Tf is friction torque, Tl is load torque, and Ti is indicated torque.

As explained above, in the first embodiment, the friction torque Tf is measured during no load, and therefore, the load torque Tl becomes zero. Consequently, a relation of the equation (2) holds true in the relation between the torque of the internal combustion engine 1 and the angular acceleration of the crankshaft of the equation (1).

$$Ti - J\frac{d\omega}{dt} = Tf \quad (2)$$

According to the equation (2), it is understood that the friction torque Tf can be obtained if inertial torque $J\times(d\omega/dt)$ and the indicated torque Ti are defined. Therefore, the friction-torque estimating unit 7A is provided with an inertial-torque estimating function $7A_5$ and an indicated-torque estimating function $7A_6$ as shown in FIG. 1.

The inertial moment J is preset as a designed value by mechanical parameters of components such as a connecting rod and the crankshaft that form the internal combustion engine 1, and is stored in the backup RAM of the ECU 17.

The ECU 17 calculates the angular acceleration $d\omega/dt$ based on the detection signal of the crank angle sensor 4. The crank angle sensor 4 outputs a crank angle signal to the ECU 17 at a period of a 10-degree crankshaft angle (CA).

Therefore, the inertial-torque estimating function $7A_5$ can estimate the inertial torque $J\times(d\omega/dt)$ from the crank angle signal obtained from the crank angle sensor 4 and the information stored in the backup RAM.

The indicated torque Ti is the sum of the torque due to cylinder pressure and the torque due to reciprocating mass (inertial).

In the first embodiment, when the friction torque Tf is to be estimated, the fuel cut to a specified cylinder is executed. Therefore, because combustion is not performed in the cylinder when the crank angle signal is measured, the torque due to the cylinder pressure in the above case can be estimated with high precision from the engine speed Ne and a load factor (which indicates how much air is taken into the cylinder). Since the cylinder pressure torque is generally used to control the internal combustion engine 1, it is already stored in the backup RAM of the ECU 17. Consequently, the cylinder pressure torque stored in the backup RAM is used in the first embodiment.

The torque due to the reciprocating mass (inertial) is preset from the mass of the designed value of the piston, and is stored in the backup RAM of the ECU 17.

Therefore, the indicated-torque estimating function $7A_6$ can estimate the indicated torque Ti from the information already stored in the backup RAM.

From the above-mentioned facts, the friction-torque estimating function $7A_1$ can obtain the friction torque Tf by substituting the inertial torque $J\times(d\omega/dt)$ and the indicated torque Ti estimated in the equation (2).

The friction-torque (map) estimating/rewriting function $7A_2$ is explained below. The friction-torque (map) estimating/rewriting function $7A_2$ includes a function of obtaining a difference between the friction torque (existing friction torque) $Tf_1$ and the friction torque (current friction torque) $Tf_2$. Specifically, as shown in FIG. 4, the friction torque $Tf_1$ is expressed on the friction torque map that corresponds to the engine speed Ne and the coolant temperature when the friction-torque estimating function $7A_1$ estimates the friction torque. The friction torque $Tf_2$ is obtained by the friction-torque estimating function $7A_1$.

The friction-torque (map) estimating/rewriting function $7A_2$ causes a current friction torque curve on the friction torque map to offset displace by the difference in the y-axial direction (axis of friction torque), and estimates each point on the friction torque curve offset-displaced as new friction torque Tf. Therefore, the friction-torque (map) estimating/rewriting function $7A_2$ is provided with a function of offset displacing, by the difference, each of the current friction torque curves at each water temperature on the friction torque map. The friction torque map is rewritten using the function.

The first misfire detector further includes a known misfire determining unit 7B. The misfire determining unit 7B obtains a rotational fluctuation ΔN of the internal combustion engine 1 based on the detection signal from the crank angle sensor 4, and determines whether misfire occurs by whether the rotational fluctuation ΔN exceeds a reference value Nb used to determine misfire (hereinafter, "misfire determining reference value Nb").

More specifically, the misfire determining reference value Nb is preset as a misfire determining map in which operating states such as the engine speed Ne and the load (load torque Tl) are set as parameters. The misfire determining unit 7B includes a function of reading an engine speed Ne obtained from the detection signal of the crank angle sensor 4 in each ignition, and calculating a rotational fluctuation ΔN from a difference between the engine speed Ne upon the last ignition and the engine speed Ne upon the current ignition. The misfire determining unit 7B also includes a function of reading a predetermined misfire determining map from the backup RAM according to the operating state such as coolant temperature of the internal combustion engine 1. The misfire determining unit 7B further includes a function of reading the misfire determining reference value Nb corresponding to the engine speed Ne and the load upon the current ignition from the misfire determining map, and determining whether misfire occurs by comparing the misfire determining reference value Nb with the rotational fluctuation ΔN.

In the misfire determining map, a correlation between the engine speed Ne, the load, and the misfire determining reference value Nb is preset as predetermined values based on designed values and experimental values in the development stage of the vehicle. Therefore, when the friction torque Tf has varied caused by degradation of the lubricating oil, the variation is not reflected over the misfire determining map in the conventional technology, which makes it impossible to reliably determine misfire with high precision.

The misfire determining unit 7B further includes a function of correcting the rotational fluctuation ΔN with the latest friction torque map rewritten by the friction-torque estimating unit. The misfire determining unit 7B determines misfire by comparing the rotational fluctuation ΔN corrected with the misfire determining reference value Nb. It is thereby possible to detect whether misfire occurs with high precision, even if the friction torque Tf fluctuates caused by the degradation of the lubricating oil, by reflecting the friction torque Tf that has fluctuated over the friction torque map.

Although the misfire determining unit 7B is explained below as an example, a method of detecting misfire used therein may be any method if it is performed based on the rotational fluctuation.

Figure 2:
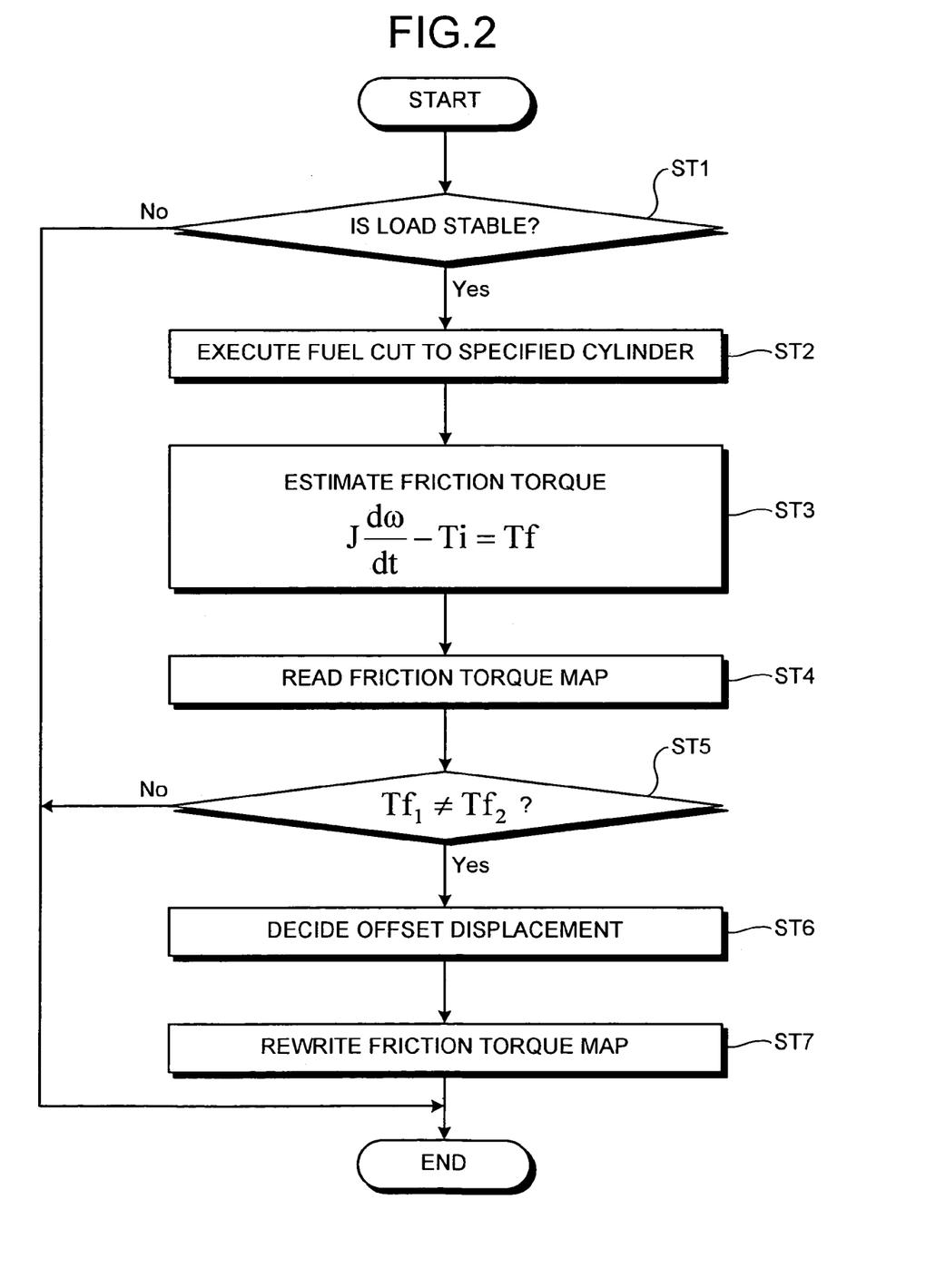
FIG. 2 is a flowchart of the operation of a friction-torque estimating unit in the misfire detector according to the first embodiment.

The operation of the first misfire detector is explained below with reference to the flowchart of FIG. 2. At first, the operation of the friction-torque estimating unit 7A of the first misfire detector is explained below.

The friction-torque estimating unit 7A studies or changes the friction torque map at least once or in a predetermined period, for example, from turning ignition on to turning it off. As shown in FIG. 2, the friction-torque estimating unit 7A determines first whether the load of the internal combustion engine 1 is stable (step ST1). Here, the friction-torque estimating unit 7A finishes the process if the load is unstable, or instructs the fuel injector if it is stable so as to execute fuel cut to a specified cylinder (here, e.g., a first cylinder).

The fuel cut to the specified cylinder is thereby executed (step ST2), and then the friction-torque estimating unit 7A estimates the friction torque Tf during the fuel cut (step ST3).

At step ST3, the friction-torque estimating unit 7A calculates an angular acceleration dω/dt based on the crank angle signal obtained from the crank angle sensor 4 in the state of fuel cut. The friction-torque estimating unit 7A multiplies the angular acceleration dω/dt by the inertial moment J stored in the backup RAM and obtains the inertial torque $J \times (d\omega/dt)$. Furthermore, the friction-torque estimating unit 7A adds the cylinder pressure torque stored in the backup RAM and the reciprocating mass (inertial) torque to obtain the indicated torque Ti. The friction-torque estimating unit 7A subtracts the inertial torque $J \times (d\omega/dt)$ from the indicated torque Ti based on the equation (2) to obtain the friction torque Tf.

When the friction torque is to be estimated, the ECU 17 calculates the engine speed Ne based on the crank angle signal, and the temperature of the coolant upon measurement of the friction torque is made apparent from a coolant temperature signal of the water temperature sensor 5 input to the ECU 17.

Figure 3:
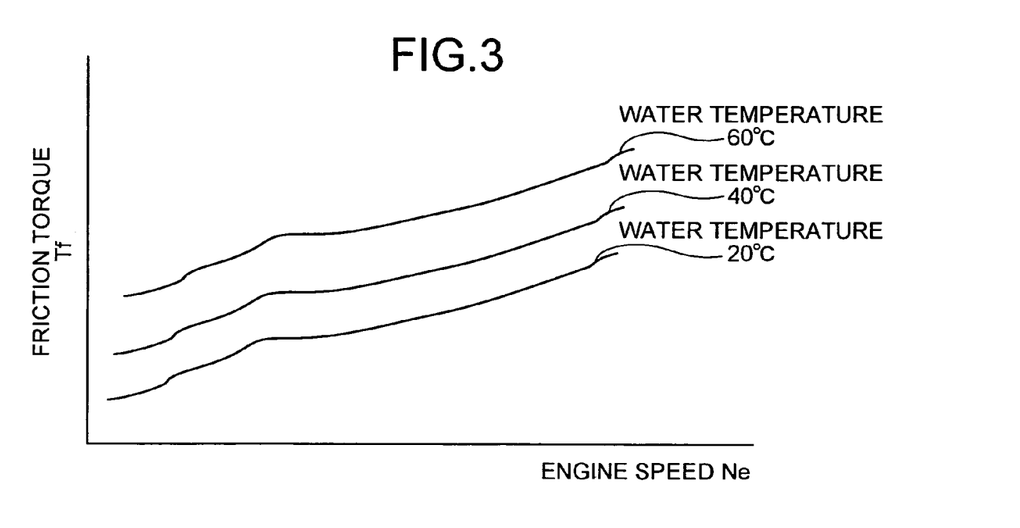
FIG. 3 is a diagram of a friction torque map of the misfire detector according to the first embodiment.
Figure 4:
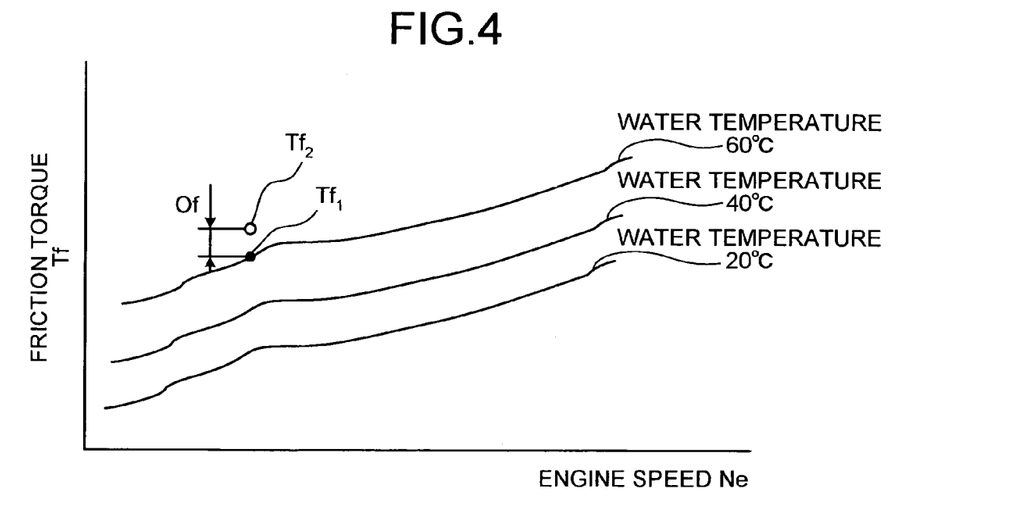
FIG. 4 is a diagram for explaining a relationship between current friction torque detected by the friction-torque estimating unit according to the first embodiment and existing friction torque, the relationship being expressed on the friction torque map as shown in FIG. 3.

The friction-torque estimating unit 7A reads the friction torque map as shown in FIG. 3 from the backup RAM (step ST4). The friction-torque estimating unit 7A compares the friction torque (existing friction torque) $Tf_1$, which corresponds to the engine speed Ne and the coolant temperature upon measurement of the friction torque, with the friction torque (current friction torque) $Tf_2$ obtained at step ST3, and determines whether there is a difference between these two values (step ST5).

If the existing friction torque $Tf_1$ has the same value as that of the current friction torque $Tf_2$, the friction-torque estimating unit 7A determines that there is no change in the friction torque Tf due to degradation of the lubricating oil, and finishes the process. If both values of the friction torques $Tf_1$ and $Tf_2$ are different from each other, the friction-torque estimating unit 7A calculates a difference between the two, and decides the difference as an offset displacement Of of a friction torque curve (step ST6). FIG. 4 depicts the current friction torque $Tf_2$ and the existing friction torque $Tf_1$ at a water temperature of 60° C. when the engine speed Ne is, for example, 2000 rpm. The friction-torque estimating unit 7A estimates points on the friction torque curve obtained by being displaced by the offset displacement, as the current friction torque Tf of the internal combustion engine 1.

Figure 5:
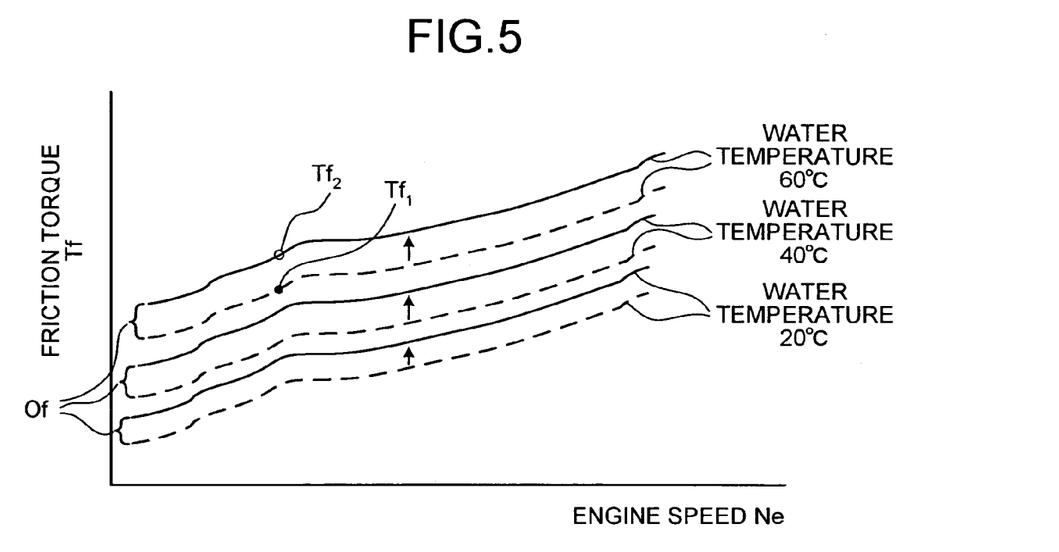
FIG. 5 is a diagram of the friction torque map that is rewritten by the friction-torque estimating unit according to the first embodiment.

The friction-torque estimating unit 7A displaces the friction torque curve by the offset displacement Of at each water temperature on the friction torque map as shown in FIG. 5, and rewrites the friction torque map (step ST7). The friction torque map rewritten is stored in the backup RAM.

The friction-torque estimating unit 7A according to the first embodiment estimates the current friction torque $Tf_2$ under arbitrary conditions when the load is stable, i.e., under an arbitrary engine speed Ne and a coolant temperature when the load is stable, and estimates the friction torque Tf in the substantially whole region based on the current friction torque Tf2 estimated. However, estimation of the friction torque Tf is not limited to the above manner. For example, when the load is stable and any one of or both of the engine speed Ne and the coolant temperature (lubricating-oil temperature) reaches a predetermined value, the friction-torque estimating unit 7A may execute fuel cut at that time to estimate the current friction torque $Tf_2$. It is thereby possible to further improve estimation precision.

Figure 6:
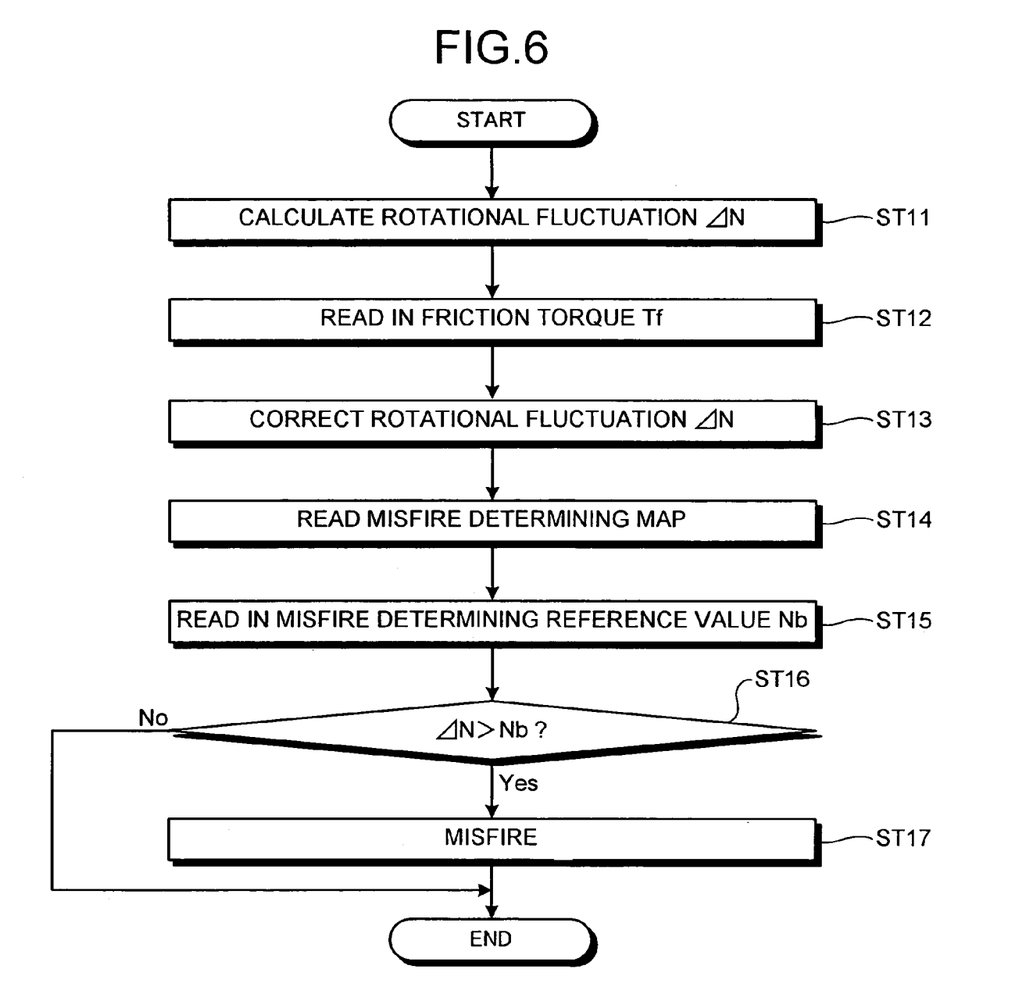
FIG. 6 is a flowchart of the operation of a misfire determining unit in the misfire detector according to the first embodiment.

The operation of the misfire determining unit 7B of the first misfire detector is explained below with reference to the flowchart of FIG. 6.

The misfire determining unit 7B reads the engine speed Ne obtained from the detection signal of the crank angle sensor 4 in each ignition, and calculates a rotational fluctuation ΔN from a difference between the engine speed Ne upon the last ignition and the engine speed Ne upon the current ignition (step ST11). The misfire determining unit 7B reads corresponding friction torque Tf from the friction torque map in the backup RAM based on the engine speed Ne upon the current ignition and the coolant temperature (step ST12). The misfire determining unit 7B corrects the rotational fluctuation ΔN using the friction torque Tf read (step ST13).

The misfire determining unit 7B reads the misfire determining map according to the operating state from the backup RAM (step ST14), and reads a misfire determining reference value Nb that corresponds to the engine speed Ne and the load upon the current ignition, from the misfire determining map (step ST15).

The misfire determining unit 7B determines whether the rotational fluctuation ΔN after being corrected is greater than the misfire determining reference value Nb (step ST16).

When the rotational fluctuation ΔN after being corrected is not greater than the misfire determining reference value Nb, the misfire determining unit 7B determines that the internal combustion engine 1 is normally operated, and finishes the process, but determines that misfire occurs when the rotational fluctuation ΔN after correction is greater than the misfire determining reference value Nb (step ST17).

As explained above, the first misfire detector can obtain accurate friction torque Tf because the friction torque Tf is estimated when the load is stable. It is thereby possible to obtain an accurate rotational fluctuation (which is the amount of motion) ΔN, thus improving precision of misfire detection.

Furthermore, the first misfire detector does not require preparation of a new component such as a sensor in order to estimate the friction torque Tf, but uses the information stored in the backup RAM that is used to control the internal combustion engine 1. Thus, high-precision misfire detection can be performed without a large increase in cost.

A misfire detector according to a second embodiment of the present invention (hereinafter, "second misfire detector") is explained below with reference to FIG. 1 and FIG. 7.

An ECU 27 shown in FIG. 1 functions as the second misfire detector. The ECU 27 includes a misfire determining unit 7C that is different from the first misfire detector. The structure other than the misfire determining unit 7C of the ECU 27 is the same as that of the first misfire detector. Hereinafter, the same reference signs as those of FIG. 1 represent the same components and functions as those of FIG. 1.

The second misfire detector is different from the first misfire detector in a method of detecting misfire that is executed by the misfire determining unit 7C.

The misfire determining unit 7C includes a function of correcting the misfire determining reference value Nb read when misfire is to be determined by the latest friction torque map rewritten by the friction-torque estimating unit. Therefore, the misfire determining unit 7C compares the rotational fluctuation ΔN with the misfire determining reference value Nb corrected. Therefore, even if the friction torque Tf fluctuates caused by degradation of the lubricating oil or the like, it is possible to perform high-precision misfire detection over which the friction torque Tf having fluctuated can be reflected.

The misfire determining unit 7C also includes the function of calculating a rotational fluctuation ΔN, the function of reading the predetermined misfire determining map, the function of reading the misfire determining reference value Nb from the misfire determining map, and the function of determining whether misfire occurs by comparing the misfire determining reference value Nb with the rotational fluctuation ΔN. These functions are the same as those in the misfire determining unit 7B according to the first embodiment.

Figure 7:
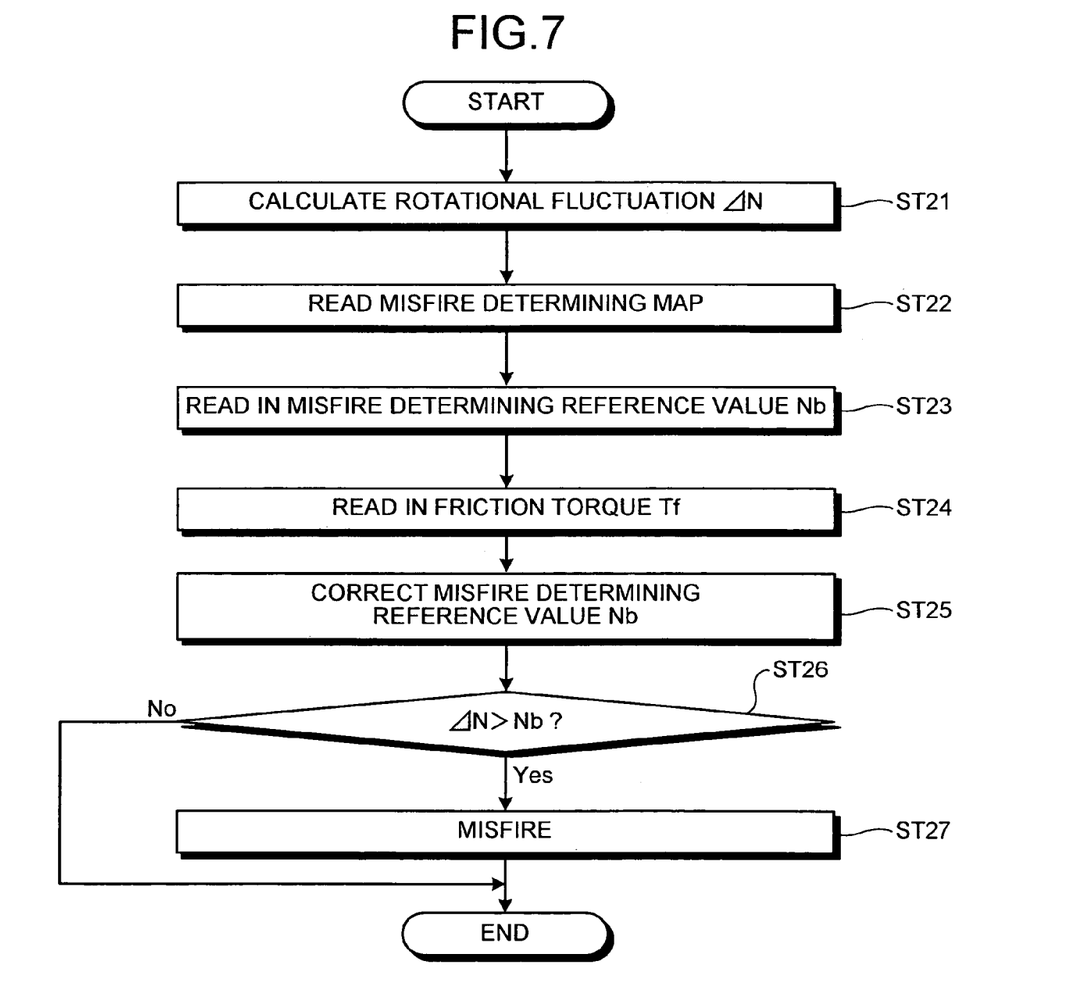
FIG. 7 is a flowchart of the operation of a misfire determining unit in the misfire detector according to the second embodiment of the present invention.

The misfire determining unit 7C performs the operations shown in the flowchart of FIG. 7.

The misfire determining unit 7C reads the engine speed Ne obtained from the detection signal of the crank angle sensor 4 in each ignition, and calculates a rotational fluctuation ΔN from a difference between the engine speed Ne upon the last ignition and the engine speed Ne upon the current ignition (step ST21). The misfire determining unit 7C reads the misfire determining map from the backup RAM (step ST22), and reads a misfire determining reference value Nb corresponding to the engine speed Ne and the load upon the current ignition, from the misfire determining map (step ST23).

The misfire determining unit 7C reads corresponding friction torque Tf from the friction torque map in the backup RAM, based on the engine speed Ne that is the misfire determining reference value Nb and the coolant temperature upon the current ignition (step ST24). The misfire determining unit 7C corrects the misfire determining reference value Nb using the friction torque Tf read (step ST25), and determines whether the rotational fluctuation ΔN is greater than the misfire determining reference value Nb after being corrected (step ST26).

When the rotational fluctuation ΔN is not greater than the misfire determining reference value Nb after being corrected, the misfire determining unit 7C determines that the internal combustion engine 1 is normally operated, and finishes the process, but determines that misfire occurs when the rotational fluctuation ΔN is greater than the misfire determining reference value Nb after correction (step ST27).

As explained above, the second misfire detector can obtain accurate friction torque Tf because the friction torque Tf is estimated when the load is stable. By correcting the misfire determining reference value Nb using the accurate friction torque Tf, it is possible to improve the precision of misfire detection.

Figure 8:
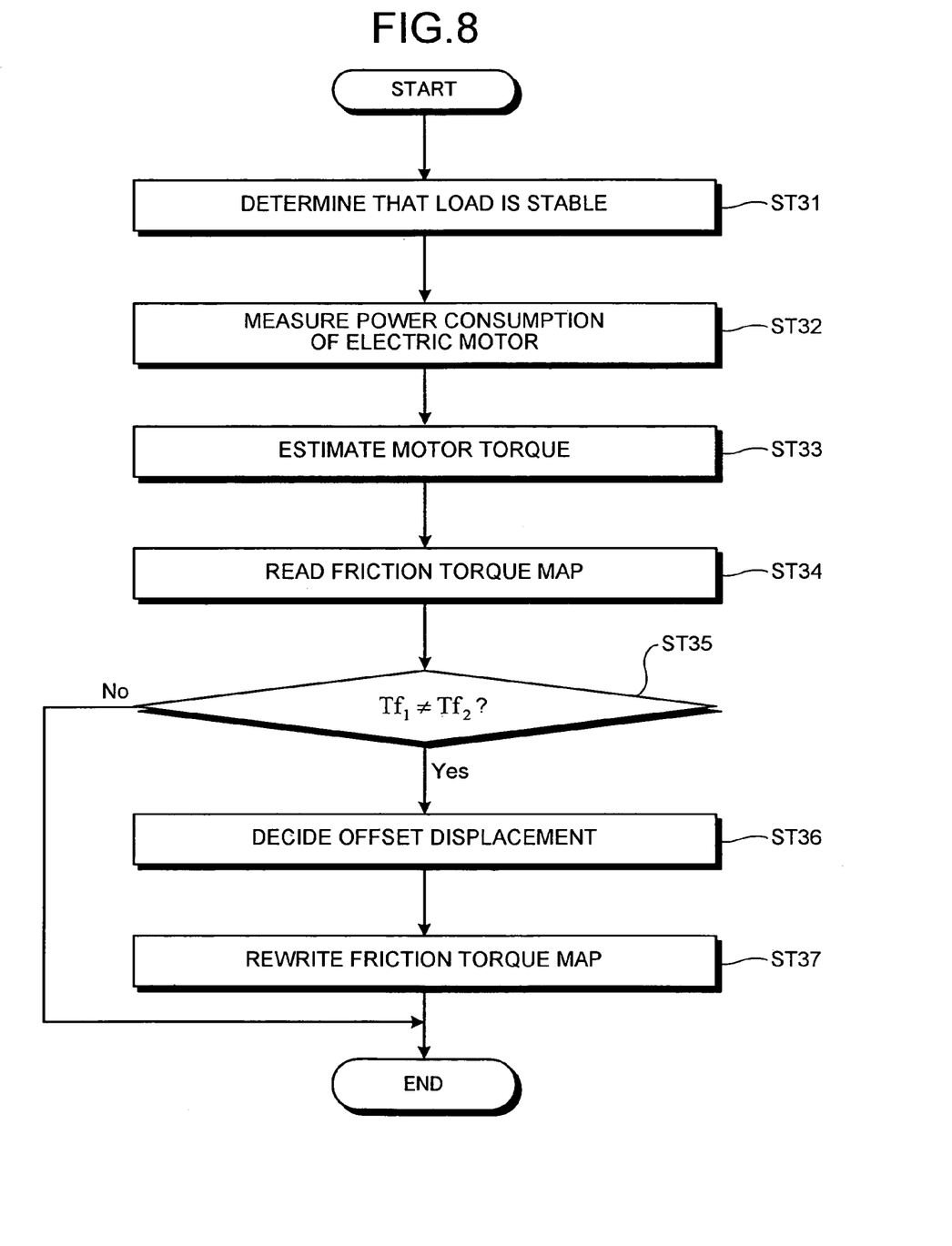
FIG. 8 is a flowchart of the operation of a friction-torque estimating unit in a misfire detector according to a third embodiment of the present invention.

A misfire detector according to a third embodiment of the present invention (hereinafter, "third misfire detector") is explained below with reference to FIG. 8 and FIG. 9.

Figure 9:
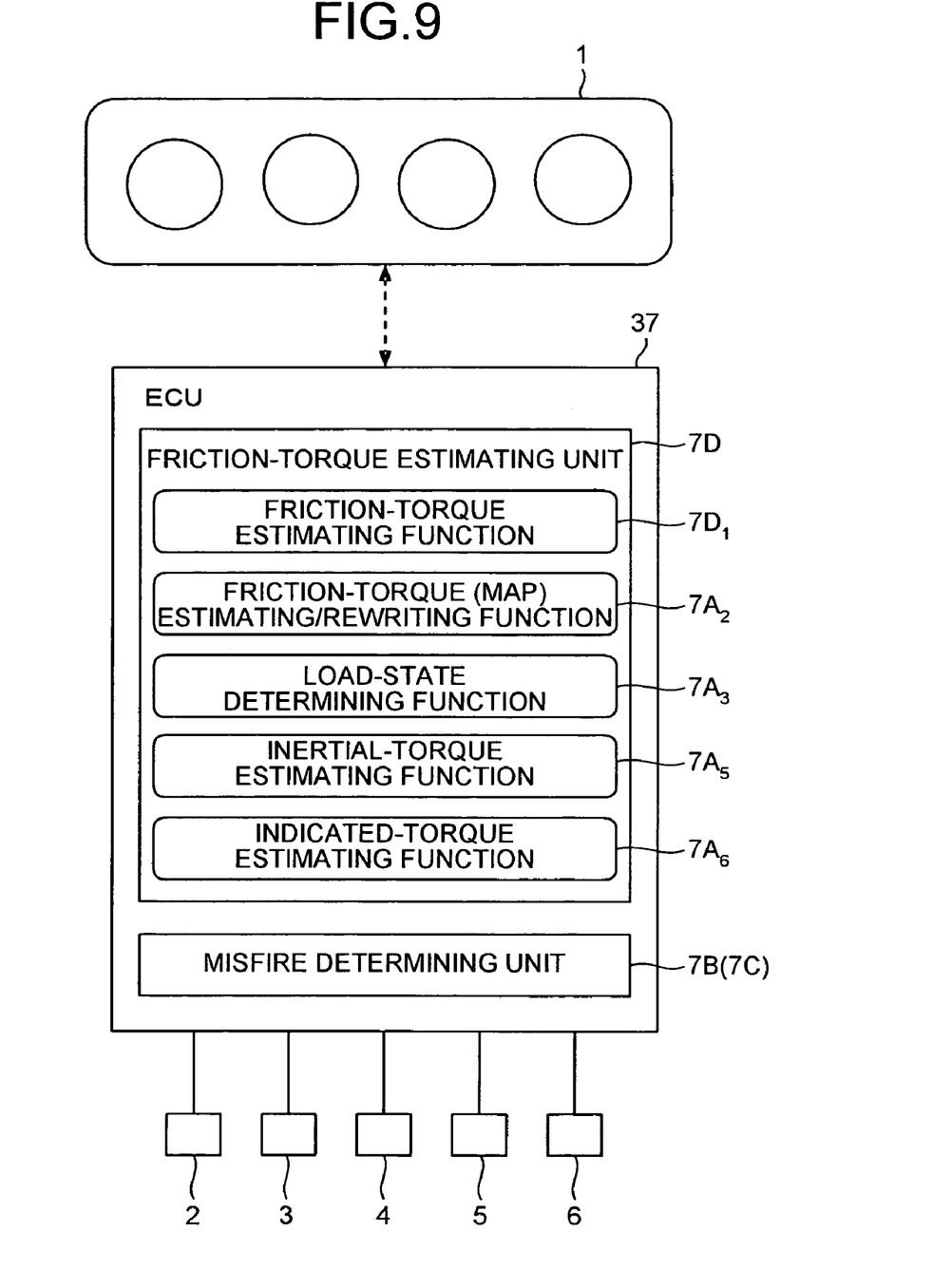
FIG. 9 is a block diagram of the misfire detector according to the third embodiment.

An ECU 37 shown in FIG. 9 functions as the third misfire detector. The ECU 37 includes a friction-torque estimating unit 7D that is different from the first and the second misfire detectors. The friction-torque estimating unit 7D includes a friction-torque estimating function $7D_1$ but does not include fuel cut function $7A_4$ of FIG. 1. The structure other than the friction-torque estimating function $7D_1$ and the fuel cut function $7A_4$ of the ECU 37 is the same as that of the first misfire detector.

The third misfire detector is different from the first misfire detector and the second misfire detector in a method of estimating friction torque Tf that is executed by the friction-torque estimating unit 7D according to the third embodiment.

In the first misfire detector and the second misfire detector, the friction-torque estimating unit 7A estimates the friction torque Tf using the equation (2), but the friction-torque estimating unit 7D of this embodiment estimates friction torque Tf from an electric motor (not shown) that starts the internal combustion engine 1.

More specifically, the friction-torque estimating function $7D_1$ of the friction-torque estimating unit 7D includes a motor-torque estimating function of obtaining power consumption of the electric motor when the electric motor is during idling before the internal combustion engine 1 is ignited, and obtaining motor torque corresponding to the friction torque Tf of the internal combustion engine 1, from the power consumption obtained.

The friction-torque estimating unit 7D includes the friction-torque (map) estimating/rewriting function $7A_2$ and the load-state determining function $7A_3$ the same as those in the first and the second embodiments. The load-state determining function $7A_3$ is the function of determining whether the load is stable by whether the internal combustion engine 1 is during cranking, which is explained with reference to the first embodiment.

In the third embodiment, the power consumption of the electric motor is obtained during idling before ignition of the internal combustion engine 1. Therefore, the fuel cut function $7A_4$ for a specified cylinder that is used when the load is stable is not provided, but it may be provided if necessary.

The operation of the friction-torque estimating unit 7D is explained with reference to the flowchart of FIG. 8.

The friction-torque estimating unit 7D determines that the load of the internal combustion engine 1 is stable when the electric motor is driven (step ST31), and obtains power consumption of the electric motor during idling before the internal combustion engine 1 is ignited (step ST32). The friction-torque estimating unit 7D estimates motor torque corresponding to the friction torque Tf of the internal combustion engine 1, from the power consumption obtained (step ST33).

In other words, when the internal combustion engine 1 is started yet before it is ignited, the ECU 37 controls a current so that the electric motor can overcome the friction torque Tf of the internal combustion engine 1. Therefore, if the friction torque Tf is greater, the power consumption of the electric motor is more increased. By using this property, the friction torque Tf can be estimated from the power consumption.

Thereafter, the rewrite processes of the friction torque map from step ST34 to step ST37 are the same as those from ST4 to step ST7 of the first and the second embodiments, and therefore, explanation thereof is omitted.

As explained above, the third misfire detector can also obtain accurate friction torque Tf because the friction torque Tf is estimated when the load is stable, and the precision of misfire detection can be improved. Particularly, estimation of the friction torque Tf from the power consumption of the electric motor is easy and makes a control program or the like simpler, which is useful.

A misfire detector according to a fourth embodiment of the present invention (hereinafter, "fourth misfire detector") is explained below.

The fourth misfire detector includes a lubricating-oil property detecting function that detects properties such as viscosity of lubricating oil, provided in the friction-torque estimating unit 7A or 7D (hereinafter, "friction-torque estimating unit 7A" as a representative of 7A and 7D) of the first to the third misfire detectors. The fourth misfire detector estimates the friction torque Tf based on the properties of the lubricating oil detected.

For example, the lubricating-oil property detecting function measures the viscosity of the lubricating oil when the coolant temperature or the lubricating-oil temperature is getting stable, and stores information on the lubricating oil properties in a backup RAM. Such processes are repeated. When the viscosity measured this time exceeds a predetermined reduction margin of the viscosity measured last time and the load becomes stable, the friction-torque estimating function $7A_1$ or $7D_1$ (hereinafter, "friction-torque estimating function $7A_1$" as a representative of $7A_1$ and $7D_1$) estimates current friction torque $Tf_2$.

As explained above, the lubricating-oil property information is used to estimate the friction torque Tf, which allows further improvement of the estimation precision.

The current friction torque $Tf_2$ estimated in the first to the fourth embodiments can also be used to determine a replacement period of the lubricating oil as explained below.

For example, friction torque information that is a threshold used to determine the replacement period of the lubricating oil is previously stored in the backup RAM. A lubricating-oil replacement period determining unit is provided in the ECU 17, 27, or 37 (hereinafter, "ECU 17" as a representative of the ECUs 17, 27, and 37). The lubricating-oil replacement period determining unit compares the friction torque information with the current friction torque $Tf_2$ estimated by the friction-torque estimating function $7A_1$, and determines the replacement period of the lubricating oil. Furthermore, an alarm unit that informs the driver of that effect by an indicator lamp or sounds is provided in the ECU 17 when the replacement period is determined.

The friction torque information is determined from experimental data obtained through actual running, and if the lubricating oil is degraded so that it requires replacement, the friction torque Tf estimated by the friction-torque estimating function $7A_1$ is used.

In the vehicle including the misfire detector according to the present invention, estimation of the current friction torque $Tf_2$ is repeated during the running. The estimation is required for the friction-torque estimating function $7A_1$ to determine whether misfire occurs.

The lubricating-oil replacement period determining unit compares the friction torque information with the current friction torque $Tf_2$ estimated by the friction-torque estimating function $7A_1$ and determines that it is time to replace the lubricating oil when the current friction torque $Tf_2$ exceeds the friction torque information. The lubricating-oil replacement period determining unit transmits an instruction so as to operate the alarm unit, and the alarm unit is operated. The driver can get to know an adequate replacement period of the lubricating oil through the alarm unit.

Figure 10:
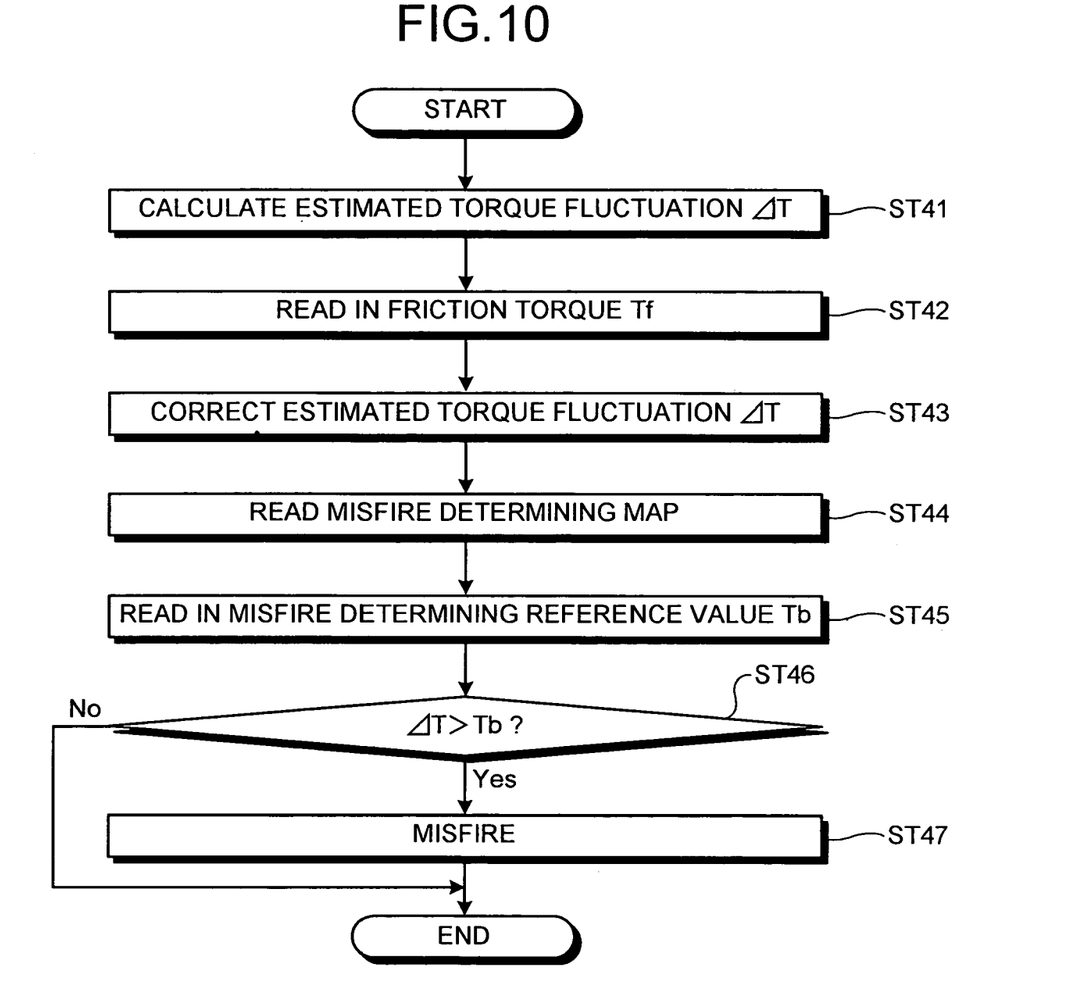
FIG. 10 is a flowchart of the operation of a misfire determining unit in a misfire detector according to a fifth embodiment of the present invention.

A misfire detector according to a fifth embodiment of the present invention (hereinafter, "fifth misfire detector") is explained below with reference to FIG. 10.

In the fifth misfire detector, the misfire determining unit 7B according to the first embodiment is changed to a misfire determining unit 7D in ECU 57 of FIG. 1 according to the fifth embodiment in the following manner, and the rest of the components in the ECU 57 are the same as these of the first embodiment.

More specifically, the misfire determining unit 7B according to the first embodiment sets a rotational fluctuation ΔN, as a parameter, that indicates the operating state of the internal combustion engine 1, and determines whether misfire occurs based on the parameter. On the other hand, the misfire determining unit 7D according to the fifth embodiment is configured to set an estimated torque fluctuation ΔT, as a parameter, that indicates the operating state of the internal combustion engine 1, and determines whether misfire occurs based on the parameter.

The misfire determining unit 7D has a function of reading an angular acceleration dω/dt of the crankshaft obtained from a detection signal of the crank angle sensor 4 in each ignition, and calculating an estimated torque fluctuation ΔT from a difference between estimated torques T respectively obtained from the angular acceleration dω/dt upon the last ignition and the angular acceleration dω/dt upon the current ignition.

A misfire determining reference value Tb used in the fifth embodiment is preset as a misfire determining map in which the operating states such as the engine speed Ne and the load (load torque Tl) are set as parameters, in the same manner as that of the misfire determining reference value Nb according to the first to the fourth embodiment. Therefore, the misfire determining unit 7D also includes a function of reading in a predetermined misfire determining map from the backup RAM according to the operating state such as coolant temperature of the internal combustion engine 1, and determines whether misfire occurs using the misfire determining reference value Tb obtained from the misfire determining map read-in.

On the other hand, the misfire determining map is preset as a predetermined map in which a correlation between the engine speed Ne, the load, and the misfire determining reference value Tb is defined based on design values and experimental values during development of vehicles. Therefore, even if the friction torque Tf is changed caused by degradation of the lubricating oil or the like, the change is not added to the misfire determining map. Accordingly, it is not possible to determine whether misfire occurs with high precision.

The misfire determining unit 7D corrects the estimated torque fluctuation ΔT with the latest friction torque map obtained by rewriting it by the friction-torque estimating unit 7A, and determines whether misfire occurs by comparing the estimated torque fluctuation ΔT after correction with the misfire determining reference value Tb. Consequently, even if the friction torque Tf fluctuates caused by degradation of the lubricating oil, the misfire determining unit 7D can perform misfire detection with high precision by adding the friction torque Tf fluctuated thereto.

From the above operation, the misfire determining unit 7D has a function of correcting the estimated torque fluctuation ΔT, and a function of reading in a misfire determining reference value Tb corresponding to the engine speed Ne and the load upon the current ignition, from the misfire determining map read-in and of determining whether misfire occurs by comparing the misfire determining reference value Tb with the estimated torque fluctuation ΔT after correction.

The operation of the misfire determining unit 7D configured in the above manner is explained below with reference to a flowchart of FIG. 10.

The misfire determining unit 7D reads in the angular acceleration dω/dt obtained from a detection signal of the crank angle sensor 4 in each ignition, and calculates an estimated torque fluctuation ΔT from a difference between the estimated torques T respectively obtained from the angular acceleration dω/dt upon the last ignition and the angular acceleration dω/dt upon the current ignition (step ST41). The misfire determining unit 7D reads in corresponding friction torque Tf from the friction torque map of the backup RAM based on the engine speed Ne and the coolant temperature upon the current ignition (step ST42), and corrects the estimated torque fluctuation ΔT using the friction torque Tf (step ST43).

The misfire determining unit 7D reads the misfire determining map according to the operating state from the backup RAM (step ST44), and reads in a misfire determining reference value Tb corresponding to the engine speed Ne and the load upon the current ignition from the misfire determining map (step ST45).

Thereafter, the misfire determining unit 7D determines whether the estimated torque fluctuation ΔT after correction is greater than the misfire determining reference value Tb (step ST46).

If the estimated torque fluctuation ΔT after correction is less than the misfire determining reference value Tb, the misfire determining unit 7D determines that the operation is normal and ends the processing. If the estimated torque fluctuation ΔT after correction is greater than the misfire determining reference value Tb, the misfire determining unit 7D determines that misfire occurs (step ST47).

As explained above, the fifth misfire detector can obtain accurate friction torque Tf because the friction torque Tf is estimated when the load is stable. It is thereby possible to obtain an accurate estimated torque fluctuation ΔT, which allows the precision of misfire detection to be improved.

In the fifth embodiment, the friction torque Tf may be estimated using the friction-torque estimating unit 7A according to the third embodiment or the fourth embodiment.

A misfire detector according to a sixth embodiment of the present invention (hereinafter, "sixth misfire detector") is explained below with reference to FIG. 11.

The sixth misfire detector is different from the fifth misfire detector in the method of detecting misfire (a misfire determining unit 7E in ECU 67 of FIG. 1 according to the sixth embodiment). It is noted that the rest of the components in the ECU 67 are the same as these of the first embodiment.

The misfire determining unit 7E has a function of correcting the misfire determining reference value Tb read-in upon misfire determination with the latest friction torque map obtained by rewriting it by the friction-torque estimating unit 7A. Therefore, the misfire determining unit 7E compares the misfire determining reference value Tb after correction with the estimated torque fluctuation ΔT. Consequently, even if the friction torque Tf fluctuates caused by degradation of the lubricating oil, the misfire determining unit 7E can perform misfire detection with high precision by adding the friction torque Tf fluctuated thereto.

The misfire determining unit 7E is the same as the misfire determining unit 7D in a point of including the function of calculating the estimated torque fluctuation ΔT, the function of reading a predetermined misfire determining map, the function of reading in the misfire determining reference value Tb from the misfire determining map, and the function of determining misfire based on comparison between the misfire determining reference value Tb and the estimated torque fluctuation ΔT.

Figure 11:
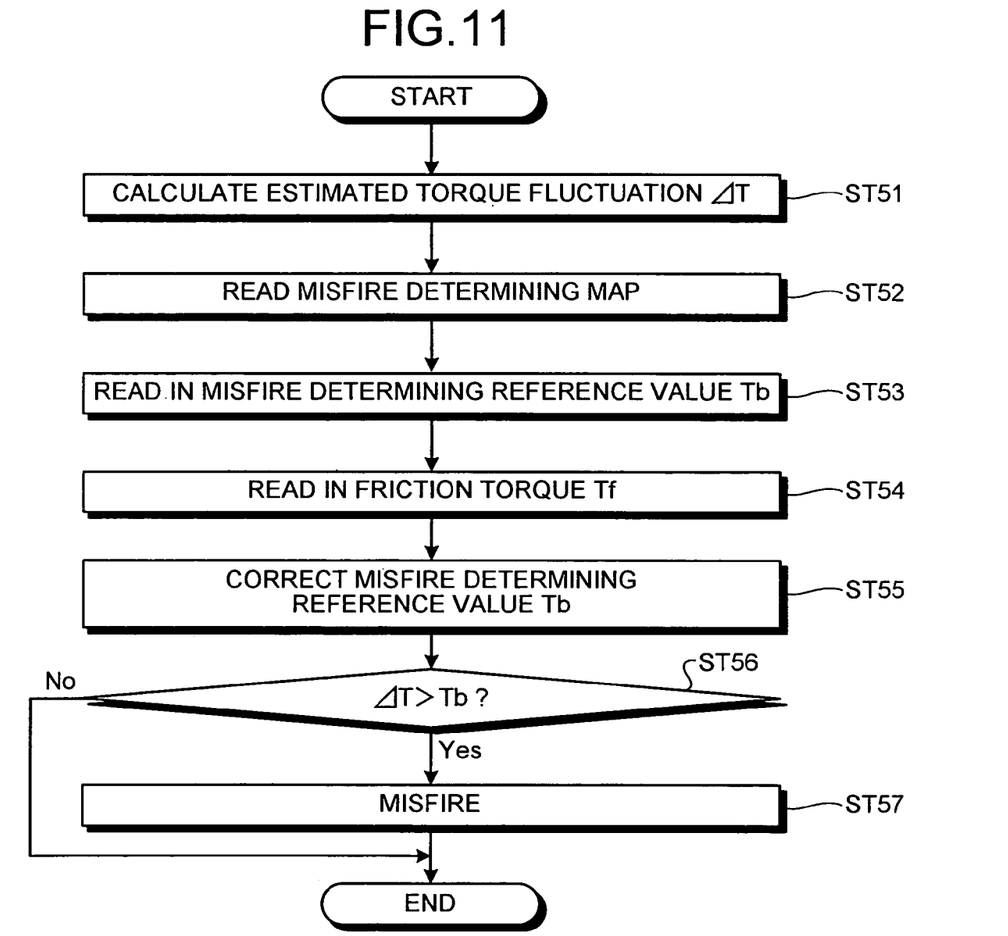
FIG. 11 is a flowchart of the operation of a misfire determining unit in a misfire detector according to a sixth embodiment of the present invention.

In such a case, the misfire determining unit 7D operates as shown in the flowchart of FIG. 11.

The misfire determining unit 7E calculates an estimated torque fluctuation ΔT in the same manner as that at step ST41 of the fifth embodiment (step ST51). The misfire determining unit 7E reads the misfire determining map from the backup RAM (step ST52), and further reads in a misfire determining reference value Tb corresponding to the engine speed Ne and the load (load torque Tl) upon the current ignition from the misfire determining map (step ST53).

Thereafter, the misfire determining unit 7E reads in corresponding friction torque Tf from the friction torque map of the backup RAM based on the engine speed Ne of the misfire determining reference value Tb and the coolant temperature upon the current ignition (step ST54). The misfire determining unit 7E corrects the misfire determining reference value Tb using the friction torque Tf (step ST55), and determines whether the estimated torque fluctuation $\Delta T$ is greater than the misfire determining reference value Tb after correction (step ST56).

If the estimated torque fluctuation $\Delta T$ is less than the misfire determining reference value Tb after correction, the misfire determining unit 7E determines that the operation is normal and ends the processing. If the estimated torque fluctuation $\Delta T$ is greater than the misfire determining reference value Tb after correction, the misfire determining unit 7E determines that misfire occurs (step ST57).

As explained above, the sixth misfire detector can obtain accurate friction torque Tf because the friction torque Tf is estimated when the load is stable, and corrects the misfire determining reference value Tb using the friction torque Tf. It is thereby possible to improve the precision of misfire detection.

In the sixth embodiment, the friction torque Tf may also be estimated using the friction-torque estimating unit 7A according to the third embodiment or the fourth embodiment.

The misfire detector according to the present invention reflects friction torque, which is one element included in the amount of motion, over the friction torque map and determines whether misfire occurs, which makes it possible to improve the precision of misfire detector. Particularly, by estimating the friction torque when the load is stable, accurate friction torque can be obtained. Furthermore, by executing fuel cut to a specified cylinder when the friction torque is to be estimated, further accurate friction torque can be obtained. Thus, it is possible to perform higher-precision misfire detection.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A misfire detector that converts an operating state of an internal combustion engine into a parameter and detects misfire of the internal combustion engine by comparing the parameter, or a value based on the parameter, with a reference value, which is used to determine misfire, the misfire detector comprising:
    a friction-torque estimating unit that includes a load-state determining unit that determines a load state of the internal combustion engine, and estimates friction torque of the internal combustion engine when the load-state determining function determines that the load is stable; and
    a misfire determining unit that determines whether misfire occurs based on either one of
        correcting the parameter using the friction torque estimated, and
        correcting the reference value using the friction torque estimated.

2. The misfire detector according to claim 1, wherein the load-state determining unit determines that the load is stable when a clutch, which transmits drive force to a wheel, is disconnected.

3. The misfire detector according to claim 1, wherein the load-state determining unit determines that the load is stable when an engine speed of the internal combustion engine is stable.

4. The misfire detector according to claim 3, wherein the stable state of the engine speed indicates an idling state of the internal combustion engine.

5. The misfire detector according to claim 1, wherein the load-state determining unit determines that the load is stable when the internal combustion engine is cranking.

6. The misfire detector according to claim 1, wherein the load-state determining unit determines that the load is stable when the internal combustion engine is in a fuel cut state.

7. The misfire detector according to claim 1, wherein the friction-torque estimating unit includes
    a fuel cut unit that cuts supply of fuel to a specified cylinder when the load-state determining unit determines that the load is stable,
    wherein the friction-torque estimating unit estimates the friction torque when the supply of the fuel is cut.

8. The misfire detector according to claim 1, wherein the friction-torque estimating unit includes
    an indicated-torque estimating unit that estimates indicated torque of the internal combustion engine; and
    an inertial-torque estimating unit that estimates inertial torque of the internal combustion engine,
    wherein the friction-torque estimating unit estimates the friction torque from a difference between the indicated torque and the inertial torque.

9. The misfire detector according to claim 1, wherein the friction-torque estimating unit estimates the friction torque when the internal combustion engine has any one of a predetermined engine speed and a predetermined temperature or both.

10. The misfire detector according to claim 5, wherein the friction-torque estimating unit further includes
    a motor-torque estimating unit that estimates motor torque of an electric motor that performs the cranking,
    wherein the friction-torque estimating unit estimates the friction torque from the motor torque.

11. A misfire detector that converts an operating state of an internal combustion engine into a parameter and detects misfire of the internal combustion engine by comparing the parameter, or a value based on the parameter, with a reference value, which is used to determine misfire, the misfire detector comprising:
    a friction-torque estimating unit that estimates friction torque of the internal combustion engine; and
    a misfire determining unit that determines whether misfire occurs based on correcting the reference value using the friction torque estimated.

* * * * *